June 10, 1941.  W. E. GILBERT  2,245,269
SUCKER ROD FATIGUE TESTING MACHINE
Filed March 4, 1939
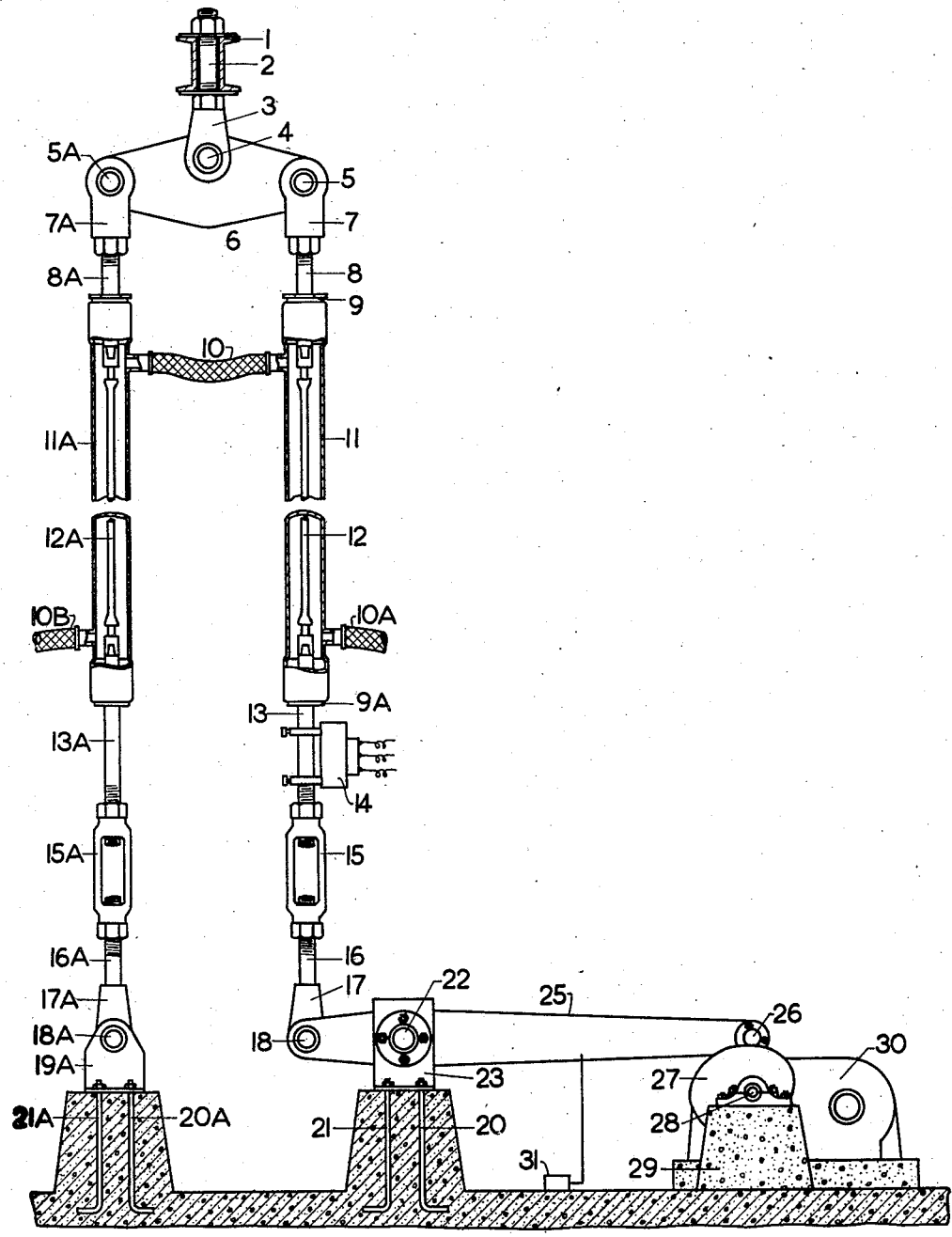
Inventor: Walton E. Gilbert
By his Attorney Patented June 10, 1941

2,245,269

UNITED STATES PATENT OFFICE 2,245,269

SUCKER ROD FATIGUE TESTING MACHINE

Walton E. Gilbert, Los Angeles, Calif., assignor to Shell Development Company, San Francisco, Calif., a corporation of Delaware Application March 4, 1939, Serial No. 259,772

5 Claims. (Cl. 73—51)

This invention pertains to the art of testing materials, and relates more particularly to a machine for testing sucker rods used in actuating oil well pumps, or materials used in manufacturing such sucker rods, said testing being carried out under controlled conditions approximating those prevailing in oil wells.

In transmitting a reciprocating motion to submerged plunger-type pumps located in deep oil wells, sucker rods commonly operate under severe corrosion fatigue conditions, being subjected to repeated or cyclic stresses, often of high magnitude, while exposed to the corrosive action of underground brines and gases which often contain high percentages of hydrogen sulfide. The effect of cyclic stresses on a metal in the presence of a corrosive medium is known as corrosion fatigue, the corrosion fatigue or endurance limit being defined as the maximum stress which can be indefinitely applied to the metal without causing its failure under any given conditions of stress or corrosion.

Since corrosion fatigue is the primary cause of a great majority of sucker string failures resulting in costly oil well shutdowns and sucker rod replacements, the problem of corrosion-fatigue is one of considerable importance in oil producing operations.

In testing the repeated-stress endurance of sucker rods or sucker rod materials, it is current practice to use rotating beam-type fatigue testing machines which subject the rod specimen to a constant bending moment, while at the same time rapidly rotating the specimen so that the outer fibers on top of the specimen are in compression while those on bottom are in corresponding tension, a complete reversal of stress occurring with each half revolution, and a full cycle of stress being completed with each revolution of the specimen. However, in actual service, rods are ordinarily subjected to cyclical variations in tension with no compression in the upper and most heavily loaded part of the rod string. Furthermore, in service, the principal load on transverse sections of the rods is applied axially, and is not induced by bending. Thus, rotating-beam type fatigue testing machines do not produce a type of loading which is typical of the cyclical loading encountered in practical use of sucker rods.

It is, therefore, an object of this invention to provide an apparatus which permits a full scale testing of sucker rods with close simulation of service conditions, and requires the expenditure of only a small fraction of the power used in actual pumping.

It is another object of this invention to provide an apparatus for simultaneously testing the relative serviceability of different makes and types of sucker rods, if desired, under widely varying conditions of load, stroke length, reciprocation rate, etc.

These and other objects of the invention will be understood from the following description, taken with reference to the attached drawing giving a diagrammatic elevation view of a preferred embodiment of the present invention.

Referring to the drawing, a suitably supported beam 1 holds, by means of a rod 2 and a clevis 3, a yoke plate 6 pivoted about a pin 4 passing through the yoke and the clevis. The yoke 6 pivotally supports, by means of pins 5 and 5A, the clevises 7 and 7A, holding supporting rods 8 and 8A.

Two lengths of sucker rods, 12 and 12A, are attached, at their upper ends, to the supporting rods 8 and 8A, and at their lower ends, to rods 13 and 13A, conventional sucker rod connecting means being used for this purpose.

Rod 13A is connected through a length-regulating turnbuckle 15A with a rod 16A engaging a clevis or socket 17A pivotally attached, by means of a pin 18A, to an anchor bracket 19A, which is held on a concrete base 20A by means of anchor bolts 21A.

Rod 13 is similarly attached, through turnbuckle 15, rod 16, socket 17 and pin 18, to one end of the lever 25, which is supported, by means of fulcrum pins 22, integrally connected thereto, in bearings mounted in an anchoring plate 23, resting on a concrete base 20 and attached thereto by means of anchor bolts 21.

The other arm of the lever 25, which may bear to the shorter arm any suitable length ratio, such, for example, as 6 to 1, is provided with a cam roller 26, riding on a cam 27 integrally connected to a shaft 28, mounted on a base 29 and driven, for example, through a suitable flexible coupling, by a variable speed motor 30, such as an electric motor. A stroke counter 31 is attached to the beam 25 to provide a means of reading the total number of cycles of stress during any particular period of testing.

As a result of the linkage described, each revolution of the cam 27 imposes a cycle of variations in tension loading on the rods 12 and 12A. The initial tension loading for any cam position may be adjusted by means of turnbuckles 15 and 15A, while the cam itself may be designed in well-known manner to produce any desired walking beam motion to induce the cyclical variations in tension stresses which it is desired to duplicate. Thus, the present device is capable of duplicating or simulating cyclical rod loading without duplication of the pumping motion and without the performance of the work which attends the cyclical loading of rods in pumping service. The cyclical loading recorded by the use of polished rod dynamometers at pumping wells may, therefore, be duplicated at any location where it is desired to test the endurance of sucker rods. Furthermore, the simultaneous testing of more than one specimen with a single testing machine permits comparative tests of different specimens under the same loading conditions.

In order to test the rods 12 and 12A under conditions approximating those prevailing in oil wells by subjecting them to the action of well fluids, tubular jackets 11 and 11A are fixedly connected to the rods 13 and 13A, and are interconnected at their upper ends by means of a flexible hose 10. Fluid inlet and outlet connections 10A and 10B are provided near the lower ends of the jackets 11, and packing glands 9 are used at the upper ends of the jackets to prevent loss of fluid while permitting the cyclical extension and contraction of the rods 12 and 12A.

The testing machine is supplied with rods 8 and 8A or 13 and 13A of different interchangeable lengths, so that sucker rods of any desired standard length, for example, 25 or 30 feet, may be conveniently tested.

If desired, a dynamometer, such, for example, as the recording dynamometer, or polished-rod dynagraph manufactured by the Westinghouse Electric and Manufacturing Company, may be affixed to the rods 13 and 13A to check the accuracy of the testing machine in duplicating a particular cycle of well loading for which the cam is designed. An extensometer can be used for the same purpose.

Normally, it is preferable to use loads and pumping speeds of the same order as encountered in actual field practice, that is, loads not exceeding 30,000 lbs. on the sucker rods, and speeds of from 10 to 45 cycles per minute, while likewise circulating through the jackets fluids of approximately the same composition and properties as those produced at pumping wells. If desired, however, tests may be accelerated by the use of abnormally large loads, abnormally high cyclical speeds, or abnormally corrosive fluids.

It is understood that in the appended claims the term "sucker rod" is intended to cover not only finished sucker rods, but also test samples of materials which may be suitable for making sucker rods.

I claim as my invention:

1. In a machine for testing sucker rods, a fixed support, a yoke pivotally supported thereby, means on either side of the pivot supporting the yoke for attaching the upper ends of two sucker rods to the yoke, means for bracing the lower end of one of said rods against axial motion, a lever, means for linking one arm of said lever with the lower end of the other sucker rod, and means to subject said sucker rod to axial cyclic tension stresses by applying a cyclic force to the other arm of the lever.

2. In a machine for testing sucker rods, a fixed support, a yoke pivotally supported thereby, means on either side of the pivot supporting the yoke for attaching the upper ends of two sucker rods to the yoke, means for bracing the lower end of one of said rods against axial motion, a lever, means for linking one arm of said lever with the lower end of the other sucker rod, and means to subject said sucker rod to axial cyclic tension stresses by applying a cyclic force to the other arm of the lever comprising, a cam in contact with the other arm of the lever, and means for rotating said cam to rock said lever.

3. In a machine for testing sucker rods, a fixed support, a yoke pivotally supported thereby, means on either side of the pivot supporting the yoke for attaching the upper ends of two sucker rods to the yoke, means for bracing the lower end of one of said rods against axial motion, a lever, means for linking one arm of said lever with the lower end of the other sucker rod, means adapted to vary the length of said linkage, a cam in contact with the other arm of the lever, means for subjecting said sucker rod to cyclic tension stresses by causing rotation of said cam to rock said lever, and means for regulating the magnitude of said stresses by adjusting the means adapted to vary the length of the linkage between the sucker rod and the lever.

4. In a machine for testing sucker rods, a substantially fixed support, pivot means for attaching one end of a sucker rod to said support, a jacket surrounding said sucker rod, means for circulating through said jacket a liquid approximating corrosive well liquids, pivot means for applying to the other end of the sucker rod cyclic tension stresses, said pivots lying substantially in the axis of said sucker rod, whereby the sucker rod is subjected to cyclic axial tension stresses free of bending components.

5. In a machine for testing materials suitable for making sucker rods a fixed support, a yoke pivotally supported thereby, means on either side of the pivot supporting the yoke for attaching the upper ends of two sucker rod test pieces to the yoke, means for bracing the lower end of one of said test pieces against axial motion, and means for applying a downward cyclic axial force to the lower end of the other test piece whereby said test pieces are simultaneously subjected to cyclic axial tension stresses.

WALTON E. GILBERT.